(12) United States Patent
Dawson et al.

(10) Patent No.: US 7,688,959 B2
(45) Date of Patent: Mar. 30, 2010

(54) METHOD FOR REMOTELY CONNECTING TO A SECURE TELEPHONE NETWORK

(75) Inventors: Christopher J. Dawson, Arlington, VA (US); Rick A. Hamilton, II, Charlottesville, VA (US); James W. Seaman, Falls Church, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 11/211,342

(22) Filed: Aug. 25, 2005

(65) Prior Publication Data

US 2007/0049248 A1    Mar. 1, 2007

(51) Int. Cl.
*H04M 1/66*     (2006.01)
*H04M 3/16*     (2006.01)
(52) U.S. Cl. ............... 379/198; 379/93.02; 455/410
(58) Field of Classification Search ............ 379/198, 379/112, 114.14–15, 114.2, 93.02; 455/410
See application file for complete search history.

(56) References Cited

U.S. PATENT DOCUMENTS

| 5,546,448 | A | * | 8/1996 | Caswell et al. ......... 379/142.05 |
| 6,141,545 | A | * | 10/2000 | Begeja et al. ............... 455/417 |
| 6,571,094 | B1 | | 5/2003 | Begeja et al. |
| 7,200,218 | B1 | * | 4/2007 | Lindley et al. ......... 379/221.11 |
| 2005/0009511 | A1 | * | 1/2005 | Bostrom et al. ............. 455/419 |
| 2006/0111105 | A1 | * | 5/2006 | Bajar et al. ............... 455/435.1 |

OTHER PUBLICATIONS

L. O. Walters et al.; "Cellular Networks: Past, Present, and Future"; Mar. 14, 2000; ACM Crossroads Student Magazine.
K. Pahlavan; "Wireless Intraoffice Networks"; ACM Transactions on Office Information Systems, vol. 6, No. 3; Jul. 1988; pp. 277-302.

* cited by examiner

*Primary Examiner*—Vivian Chin
*Assistant Examiner*—Paul Kim
(74) *Attorney, Agent, or Firm*—Whitham, Curtis, Christofferson & Cook, P.C.; William E. Schiesser

(57) ABSTRACT

A system and method for allowing remote callers to access a secure telephone network maintains a registry (i.e. a database) of all remote callers that have access to the network. The registry contains an electronic serial number (ESN) and a personal identification number (PIN) for each remote caller. The ESN is typically the serial number of the callers cellular telephone. Alternatively, the ESN is a phone number of the remote caller's telephone. To establish a connection, the remote caller calls a private branch exchange (PBX) of the secure network. Upon receiving the call, the PBX compares the ESN and PIN of the remote caller with the ESN and PIN stored in the registry. If a match is found, the PBX authenticates the remote caller and allows the connection. The remote caller may have full access or access limited by a connection policy.

10 Claims, 2 Drawing Sheets

Remote Access Registry

| Remote Caller | ESN | PIN | Connection Policy |
|---|---|---|---|
| Mark Smith | 528345238 745829385 | 6346 | No access to corporate officers |
| Paula Ernest | 528345238 | 7459 | Access only during business hours |
| David Weiss | 875933846 | 2656 | Full access |
| Jennifer Dawson | 782835938 | 7488 | Full access within department |

METHOD FOR REMOTELY CONNECTING TO A SECURE TELEPHONE NETWORK

FIELD OF THE INVENTION

The present invention relates generally to secure telephone networks. More particularly, the present invention relates to a method for remotely accessing the secure network so that the remote connection enjoys all the functionality (e.g., call transfers, conference calling, operator access, etc.) of a local connection to the network.

BACKGROUND OF THE INVENTION

Secure internal telephone networks are commonly used by large corporations, educational institutions and government agencies. Typically, a network user can connect to another user by simply dialing an extension number (e.g., a 4-digit extension). The network typically provides enhanced functionality such as call transfers, local network operator calls, voicemail checking, voicemail forwarding, and built-in conference calling capability.

One disadvantage of secure telephone networks is that many of the useful network functions (e.g. call transfers) can only be accessed from an extension within the network. This typically means that the user must be located within the office or building containing the network in order to use the network functions. There is no way to allow external users to access the network functions.

For example, a remote caller located at home, or calling from a cellular phone may dial an extension number internal to the network, but will be unable to transfer calls, transfer voicemail, or participate in conference calls internal to the phone network.

An additional disadvantage of this lack of access is that connections external to the network (e.g., requiring uses of a telephone company network) are relatively expensive compared to connections internal to the network.

With an increasing number of people working at home and away from the office, the ability to remotely access a secure, internal telephone network is greatly needed.

It would be an advance in the art of telephone networks to allow a remote user to access a secure telephone network, and make use of all the functionality the network offers. Remote access to the network should be guarded with a high level of security. It would be particularly useful for the connection method to be simple and transparent to the external user.

U.S. Pat. Nos. 6,571,094 and 6,141,545 each teach methods for remote call forwarding to users (e.g. cellular telephone users) outside a secure network. They do not teach how to dial into a secure telephone network.

SUMMARY OF THE INVENTION

The present invention provides a method for connecting a user of a remote telephone to a secure telephone network. In the method, a remote access registry stores electronic serial numbers (ESNs) and personal identification numbers (PINs) for each of a plurality of remote telephones and users. When remote access is desired, the ESN of a remote telephone and PIN of a user is transmitted to the secure network. The registry is then searched for an entry with a matching ESN and PIN. If a match is found access is granted to the secure network. If a match is not found, access is denied.

The registry may also store a connection policy associated with each remote telephone or user. The connection policy may specify when the network will allow a connection (e.g. specify certain times of day, or days of the week), or specify which extensions can be accessed.

The remote telephone can be a cellular telephone or a land line telephone. If the remote telephone is a cellular telephone, then the ESN can be the serial number electronically stored on the telephone. If the remote telephone is a land line telephone, then the ESN can be the phone number associated with the telephone line.

The PIN can be stored on the remote telephone and transmitted automatically, or can be manually entered by the user every time access is desired.

The ESN may uniquely identify a cellular telephone.

The present invention also provides a secure network telephone system having a remote access registry storing an ESN and PIN for each remote telephone and user, and having a secure network private branch exchange (PBX). The PBX receives incoming calls and routes them to the appropriate extension. The PBX authenticates remote calls by comparing the ESN and PIN of the remote telephone and user with ESNs and PINs stored in the remote access registry. The remote access registry may also store a connection policy for each user.

DETAILED DESCRIPTION OF THE PREFERRED EMBODIMENTS OF THE INVENTION

The present invention provides a method for connecting a remote caller to a secure telephone network. In the present method, the secure network maintains a registry of electronic serial numbers (ESN) and personal identification numbers (PIN) of all remote callers that have access to the network. When a call is received at a secure network private branch exchange (PBX), the secure network authenticates the call by comparing the ESN and PIN of the remote caller with the ESN and PIN stored in the registry. When the remote caller is authenticated, the remote caller is allowed access to the secure network. The access may be limited by a connection policy that may restrict access to certain extensions or limit access at certain times of day for example. The present invention allows a remote caller to securely access the network, and enjoy the full functionality of the secure network.

Figures 1, 2:
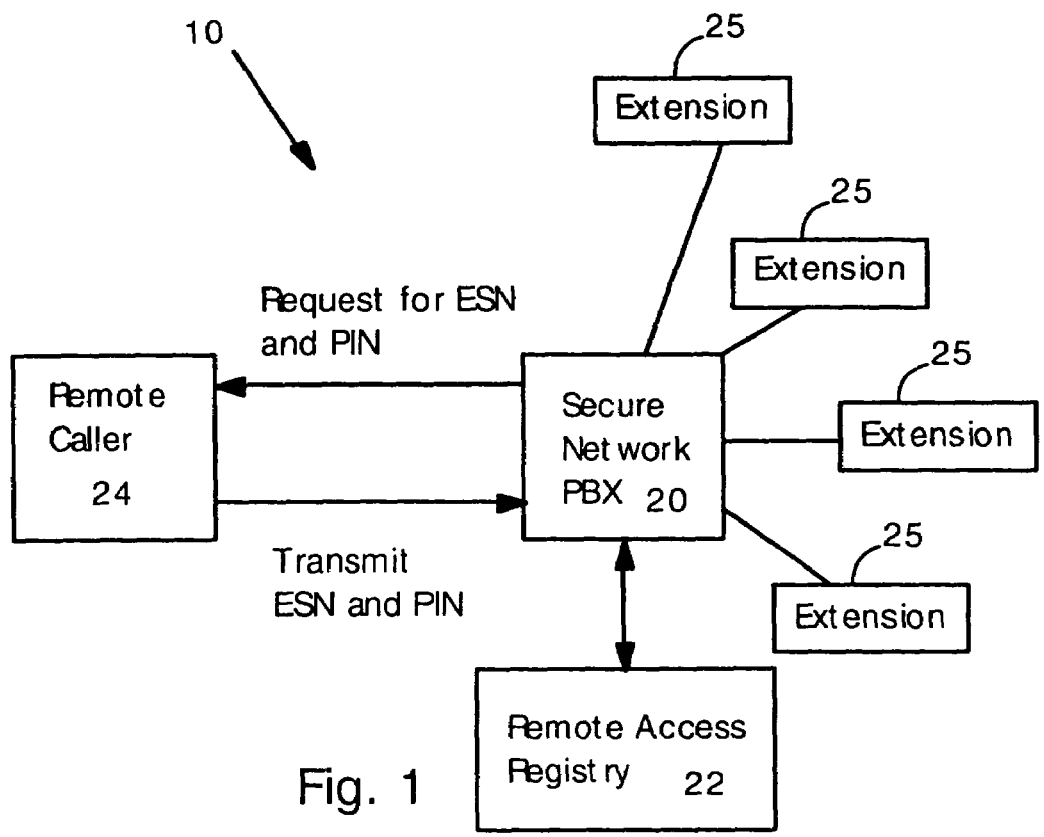
FIG. 1 shows a schematic illustrating the connections between the remote caller, network PBX, remote access registry, and network extensions.
FIG. 2 shows a diagram of a remote access registry for storing electronic serial numbers and Pin numbers for remote callers.

FIG. 1 shows a schematic diagram illustrating components of the present secure network system 10. The secure network comprises a secure network private branch exchange (PBX) 20 and a remote access registry 22. The network PBX 20 is connected to a plurality of network extensions 25; each extension represents a person or office with a telephone. A remote caller 24 communicates with the secure network via the secure network PBX 20.

The remote access registry is schematically illustrated In FIG. 2. The registry 22 comprises a database of remote callers that have access to the secure network system 10. The registry stores an electronic serial number (ESN), a personal identification number (PIN), and a connection policy for each remote caller. The remote callers can be listed by name (as shown) or by some other data, such as an employee number or by ESN or PIN. The ESN is typically the serial number of the remote callers cellular phone. Every cellular phone has a unique, or nearly unique serial number, as well known in the art. The ESN is typically a 10-digit or longer sequence of numbers. The PIN is programmable by the remote caller.

The remote access registry 22 also stores a connection policy for each remote caller. The connection policy specifies the access level for each caller. The connection policy may depend on the time of day, date or day of the week. The connection policy may allow access to only certain people (i.e. extensions) or to certain departments, for example. Exemplary connection policies are listed in FIG. 2.

Figure 3:
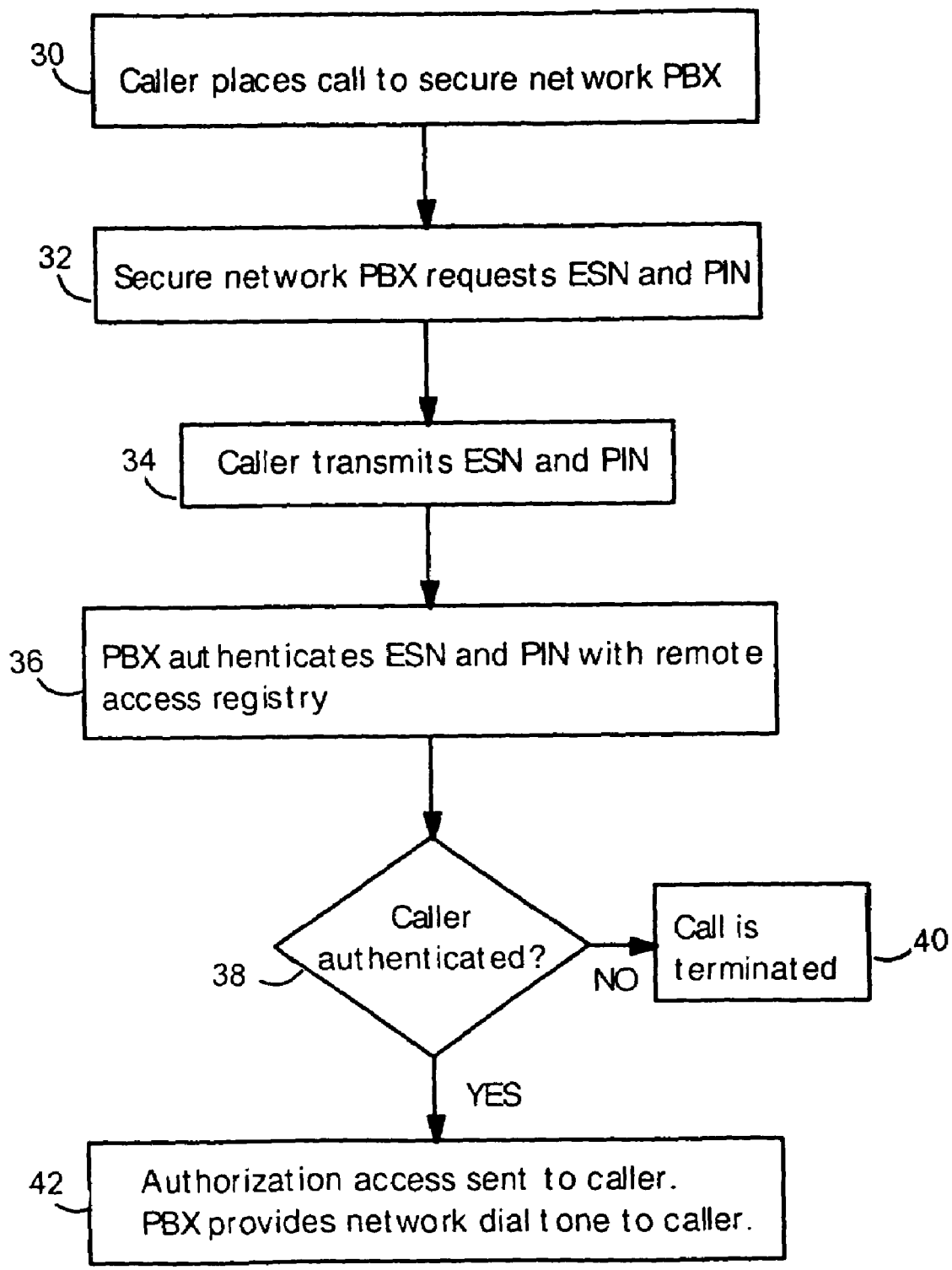
FIG. 3 shows a flow chart illustrating the method of the present invention.

The method of the present invention is illustrated in the flow diagram of FIG. 3. In a first step 30, the remote caller calls the secure network PBX by dialing a special access number (e.g. a conventional 10-digit telephone number). The network PBX 20 receives the incoming call from the remote caller 24, and in response requests the ESN and PIN of the remote caller. The ESN will typically be provided automatically by the remote caller's cellular phone, or, alternatively, can be entered manually. The secure network will also request, in step 32, the remote callers PIN. The PIN may also be provided automatically by the cellular phone. Alternatively, the PIN is entered using the keypad of the cellular phone. The ESN and PIN are then transmitted to the secure network PBX in step 34, where they are authenticated against the registry in step 36.

As noted at decision block 38, if the ESN and PIN do not have a match in the registry, the call is terminated at step 40 and the remote caller is denied access.

If the ESN and PIN do have a match in the registry, the call is accepted at step 42, and the remote caller may then dial an extension number to be connected to an extension 25. The remote caller may also access internal network functions such as voicemail forwarding, call transfers and the like.

It is important to note that the registry stores the ESNs and PINs as matched pairs. Hence, a call is authenticated only if the ESN and PIN match both the ESN and PIN in a single entry. The secure network PBX will not authenticate a call with an ESN and PIN that do not form a matched pair.

However, it is noted that a single ESN can have more than one matched PIN. This will allows multiple persons to access the secure network with the same remote telephone, with each person using their own unique PIN. For example, Mark Smith and Paula Ernest in the registry of FIG. 2 are able to use the telephone with the ESN "528345238".

Also, a single PIN can have more than one matched ESN. This will allow a single person to access the secure network with more than one telephone, while using the same PIN for each telephone. For example, Mark Smith of FIG. 2 can use the same PIN with two different telephones.

In an alternative embodiment of the invention, the phone number of the remote caller is used as the ESN. This aspect of the invention is particularly useful when the remote caller is calling from a conventional land-line (i.e. non-wireless) connected telephone. In this case, the ESN (i.e. phone number), and PIN are used for authentication in the same manner as in the process described in FIG. 3. The phone number may be automatically transmitted to the secure network PBX using the well known 'caller ID' function.

The present invention provides a simple, secure and fast method for allowing remote callers to access a secure telephone network. The ESN in combination with the programmable PIN provides adequate security for most secure telephone networks. The present method allows only specific telephones (identified by ESN) operated by specific personnel (identified by PIN) to access the secure network. The method is easy and fast for remote callers because the ESN is transmitted automatically, and only the PIN needs to be entered.

In a preferred embodiment of the invention, the call to the secure network PBX is made using an abbreviated dialing method. Specifically, the remote caller telephone can be programmed to call the secure network PBX when two specially programmed keys are dialed. For example, dialing "*9", or "#9*" can cause the remote caller's telephone to dial the 10-digit phone number of the secure network PBX. In this way, the remote caller can contact the secure network rapidly and efficiently. The method for programming abbreviated commands in a telephone is well known in the art. For example, when abbreviated commands are used, the dialing sequence for accessing the network may comprise: (*9), the PIN and the 4-digit extension.

It will be clear to one skilled in the art that the above embodiment may be altered in many ways without departing from the scope of the invention. Accordingly, the scope of the invention should be determined by the following claims and their legal equivalents.

What is claimed is:

1. A method for connecting a user of a remote telephone to a secure telephone network comprising the steps of:
   providing a secure telephone network having a plurality of network extensions, said secure telephone network capable of being accessed by a remote telephone;
   providing one or a plurality of remote telephones capable of accessing said secure telephone network;
   providing a registry connected to the secure telephone network, said registry comprising
      at least one registry entry comprising a matched pair comprising one electronic serial number (ESN) identifying a remote telephone and one personal identification numbers (PINs) identifying a user, wherein each said ESN is found in a plurality of matched pairs and each said PIN is found in a plurality of matched pairs, and
      a connection policy specifying,
         for each network extension, access times when access is permitted and each matched pair authorized to obtain access and
         for each ESN-PIN matched pair, access times when access is permitted and each network extension to which the matched pair is authorized to obtain access;
   transmitting a connection request to the secure telephone network, said connection request comprising a specified ESN-PIN matched pair;
   searching the registry for a registry entry containing ESN-PIN matched pair transmitted in the connection request; and
   taking one action of a group consisting of:
      in response to not finding a registry entry for the transmitted ESN-PIN matched pair, denying access by the remote telephone to the secure telephone network and
      in response to finding a registry entry for the transmitted ESN-PIN matched pair, applying the connection policy to the connection request and taking one action of a group of actions comprising
         denying access to the secure telephone network where a request for access is not permitted by the connection policy and
         granting access to the secure telephone network only to the extent permitted by the connection policy.

2. The method of claim 1 wherein the remote telephone is a cellular telephone, and the ESN is a serial number electronically stored in the cellular telephone.

3. The method of claim 1 wherein the remote telephone is a land line telephone, and the ESN is a phone number associated with the land line telephone.

4. The method of claim 1 wherein the PIN of the remote telephone user is manually entered by the user each time a connection is made to the secure telephone network.

5. The method of claim 1 wherein the PIN of the remote telephone user is electronically stored in the remote telephone.

6. The method of claim 1 wherein the ESN uniquely identifies a cellular telephone.

7. A secure network telephone system providing remote access for a user of a remote telephone comprising a secure telephone network for receiving incoming calls and routing the incoming calls to a plurality of extensions;

one or more remote telephones capable of connecting to said secure telephone network, each of said one or more remote telephones having means to transmit a connection request to said secure telephone network, said connection request comprising a dataset comprising an electronic serial number (ESN) of the remote telephone, a personal identification number (PIN) of a user of the remote telephone, and a network extension to which connection is being requested; and a registry database connected to said secure telephone network, said registry database comprising one or more storage devices storing registry data comprising ESN data comprising an ESN for each of said one or more remote telephones having authorization to connect to a network extension, PIN data comprising a PIN for each of one or more remote users having authorization to connect to a network extension;

at least one registry entry comprising a matched pair comprising one electronic serial number (ESN) identifying a remote telephone and one personal identification numbers (PINs) identifying a user, wherein each said ESN is found in a plurality of matched pairs and each said PIN is found in a plurality of matched pairs; and connection policy data comprising a connection policy specifying for each network extension, access times when access is permitted and each combination of ESN and PIN authorized to obtain access and for each combination of ESN and PIN for which access is authorized, access times when access is permitted and each network extension to which access may be obtained;

wherein the secure telephone network is capable of comparing the connection request dataset to a group comprising the registry database data.

8. The secure network telephone system of claim 7 wherein the ESN is electronically stored on the remote telephone.

9. The secure network telephone system of claim 7 wherein the PIN is electronically stored on the remote telephone.

10. The secure network telephone system of claim 7 wherein said secure telephone network system is a secure network private branch exchange (PBX).

\* \* \* \* \*